United States Patent Office 3,343,823
Patented Sept. 26, 1967

3,343,823
PROCESS AND APPARATUS FOR CONTROLLING THE TEMPERATURE PREVAILING IN A SINTERING GRATE OF THE TYPE USED FOR DRYING AND CALCINING SHAPES
Kurt Schmeiser, Cologne, and Kurt Lehmann, Hans-Werner Ziegler, and Werner Kowalski, Knapsack, near Cologne, Germany, assignors to Knapsack Aktiengesellschaft, Knapsack, near Cologne, Germany, a corporation of Germany
Filed June 22, 1965, Ser. No. 465,909
Claims priority, application Germany, June 27, 1964, K 53,337
8 Claims. (Cl. 263—28)

ABSTRACT OF THE DISCLOSURE

Process and apparatus for controlling the temperature of a sintering grate comprising infrared measuring means positioned directly below and adjacent to the sintering grate for measuring the infrared radiation emitted by the underside of the grate across its entire width.

---

The present invention provides a process and apparatus for operational control of the temperature prevailing in thermally most stressed portions of a sintering grate such as more especially used for drying and calcining pellets.

Conventional methods of temperature control generally use a sensible element with a more or less punctiform or perhaps linear extension. For temperature control, the sensible element is heated at the temperature prevailing at a given test point so as to change, in a manner readily determinable by testing methods, one or the other of its physical properties as a function of the temperature prevailing. It is known that especially thermoelements and resistance thermometers are suitable for this. However, under conditions such as prevail in a sintering plant, temperature data as determined on one or more punctiform test points do not permit conclusions to be drawn as to the temperature prevailing in the sintered material or on the sintering grate. In the arched space above the sinter material, the temperature sensible element is subject to radiation emitted from the hot arch, to radiation emitted from the sinter material, and to the action of heat as transmitted by hot gas flow, radiation as emitted by such hot gases being ignored. Below the sintering grate, the temperature sensible element must be expected to be exposed to flow action which varies as a function of the type of sinter material and the operation of the sintering grate, where conventional methods again fail to give reliable test results.

In the process described in DAS 1,167,317 a so-called covering or protecting layer serves to operate the sintering grate under conditions milder than usually employed. To this end, a layer of sinter material placed on the sintering grate is calcined to an extent corresponding approximately to ⅘ of the total height of said layer, whilst the ⅕ layer balance portion of sinter material, which serves as a covering or protecting layer for the sintering grate, is merely preheated and thereafter allowed to ripen in a sojourn and hardening zone and in a heat compensation zone so as to confer the necessary strength properties upon the said preheated sinter material.

As applied to phosphate pellets, for example, the slack strand of a sintering grate travelling from an uncalcined or "green" pellet feed point to a calcined pellet discharge place is exposed to considerable and periodically alternating thermal stress. The temperature prevailing in the drying zone is gradually increased from 150 to about 400° C., whereas the temperature prevailing in the calcining zone is gradually increased from about 900 to 1000° C., the temperature prevailing in the arch above the sintering grate being about 50° C. higher. In the gas chamber of the sojourn and hardening zone, the temperature reaches a value of about 600 to 700° C. whilst the pellets have a temperature of about 900° C. for an admissible maximum temperature of about 600° C. in the gas chamber disposed below the sintering grate. These temperature limits are intended to prevent the sintering grate from becoming exposed to too abrupt a temperature change which may give rise to premature embrittlement of the alloyed steel used as construction material for the sintering grate.

To meet demands for an improved sinter plant capacity associated with a reduced specific consumption of calorific energy, it is necessary to vary the operating conditions applied to a sintering grate by various means which in addition to the features disclosed in DAS 1,189,053 include steps for reducing the covering or protecting sinter material layer to an extent approaching a value of zero. Reducing the covering or protecting layer to such extent will naturally result in the sintering grate being exposed to increased thermal stress, which calls for reliable control of the temperature prevailing therein. Such temperature control is the object of the present invention.

We have now found that temperature control in a sintering grate, so important for operation, can be achieved in reliable manner by continuous quantitative determination and evaluation, in the region of a sojourn/hardening zone following a calcining zone, in which region the sintering grate temperatures reach their maximum values, of thermactinic radiation emitted by the underside of the grate plates forming part of the slack strand of a sintering grate, the determination and evaluation serving as a measure indicating the temperature prevailing on the said grate plates across a large surface area, i.e. across the whole width of the sintering grate.

The thermactinic radiation is quantitatively determined by applying the principle of infrared radiation testing methods.

In accordance with the present invention, the underside surface portions of the grate plates to be controlled are optically projected on the sensible element of an infrared radiation-sensitive pick-up such as described in the technical paper entitled "Volltransistorisierte Infrarot-Fotosteueranlage" published by Exatest of Leverkusen, Germany. This expedient and the high sensitivity of the infrared radiation-sensitive pick-up will even permit locally limited deviations from a given mean grate plate temperature, i.e. local superheating, to appear in the test result.

In accordance with the temperature admissible or required for the grate plates, the present invention uses a range of radiation from the visible to long wave infrared.

Temperature radiation in the region of the sojourn/hardening zone is determined by testing for at least two grate cross-sectional areas one disposed after the other in the direction of motion of the sintering grate slack strand across the whole width of the sintering grate.

The process of the present invention can be applied e.g. to the apparatus described in DAS 1,167,317 which comprises two convenional travelling grates connected in series for the drying and calcining of crude phosphate shapes, where the second travelling grate is a cooling grate and travels through a cooling zone, whereas the first travelling grate which serves as a sintering grate travels successively through a drying zone, a calcining zone and a sojourn/hardening zone, the transition area of the first to the second travelling grates being located inside a heat compensation zone, and each zone comprising at least one chamber.

As taught in DAS 1,189,053, the individual chambers or zones are separated from one another by means of inserted partition walls which serve to improve the spacing of individual zones and to permit more exact flow of exhaust gas, hot gas and issuing gas. The sojourn/hardening zone has shutoff and control means which alternatively enable exhaust gas coming from the calcining zone to be suction-drawn to a greater or lesser extent across a layer of sinter material, or enable the removal of exhaust gas to be arrested or enable hot air coming from the cooling zone to be injected against the forward band or slack strand of the sintering grate for the purpose of cooling.

The test points are more especially located within the region of the calcining zone and sojourn/hardening zone following the calcining zone. Each of the test points provided in accordance with the present invention within the region of the last calcining chamber and sojourn/hardening chamber consists of two coplanar infrared radiation-sensitive pick-up means disposed in opposite relationship to one another, where one pick-up is disposed on the left hand side and the other is disposed on the right hand side seen in the direction of motion of the sintering grate slack strand with each pick-up providing for overlapping control of half the width of the sintering grate nearest thereto.

Two such test points are series-connected to one another in the direction of motion of the sintering grate slack strand. One test point is adjusted to have a temperature corresponding to the admissible maximum temperature of the sintering grate, and the other is adjusted to have a temperature corresponding to the minimum temperature of the sintering grate.

In view of the fact that at the temperatures concerned which should not exceed 600° C. for the grate plates, the free gas volume emits infrared radiation very limited in power as compared with the radiation of a solid, more or less black material, testing is practically independent of gas flow.

As a sintering plant does not permit the formation of dust to be avoided, the image-forming optical system of the infrared radiation-sensitive pick-up is provided with a readily exchangeable sliding-on cap having a permeability sufficient for the spectral region concerned. The cap is intended to avoid the access of dust and simultaneously to protect the lenses against the action of corrosive gases and vapours such as evolved by fluorine contained in some phosphate grades.

The invention is shown diagrammatically in the accompanying drawings and applied more specifically to a phosphate sintering plant equipped with a Lepol grate.

Referring to the drawings.

Figure 1:
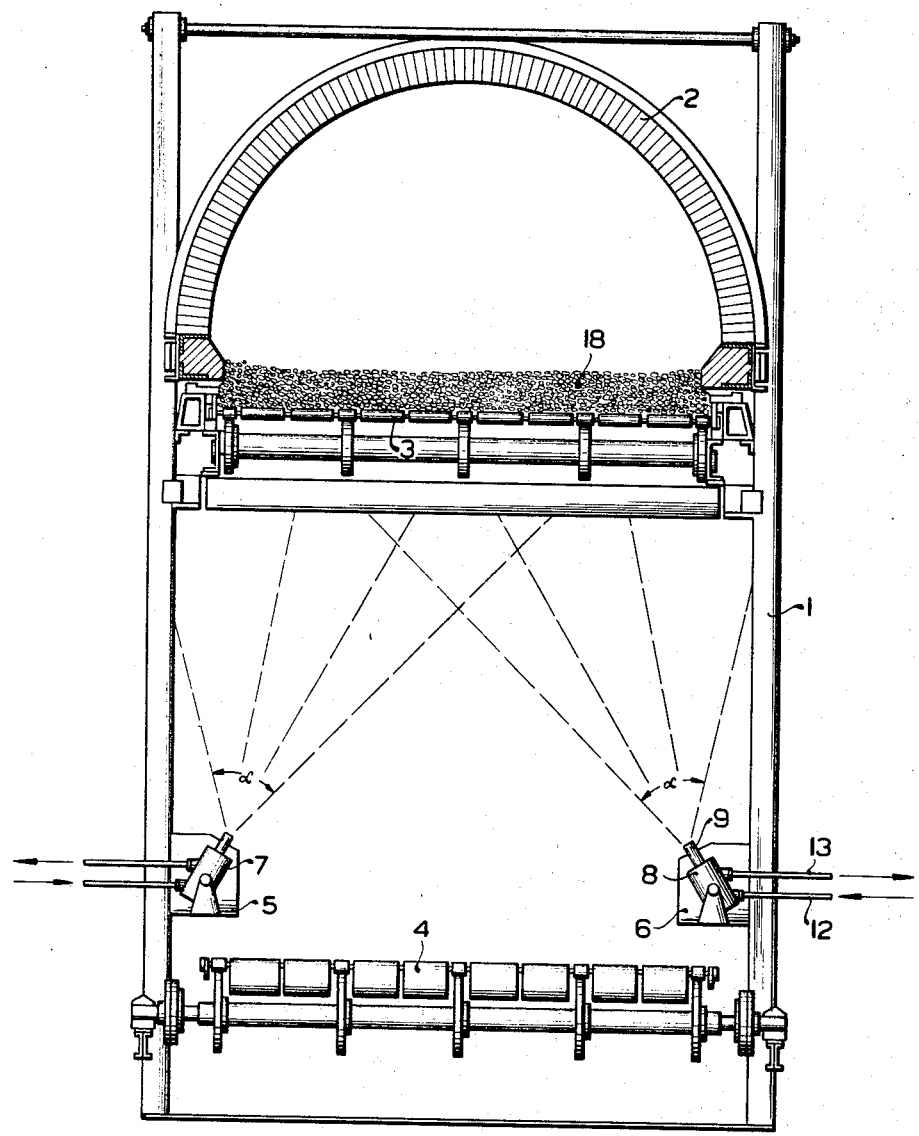
FIGURE 1 represents a cross-sectional view of such plant and the assembly of the infrared radiation-sensitive pick-up means disposed opposite to one another and together forming a test point.
Figure 2:
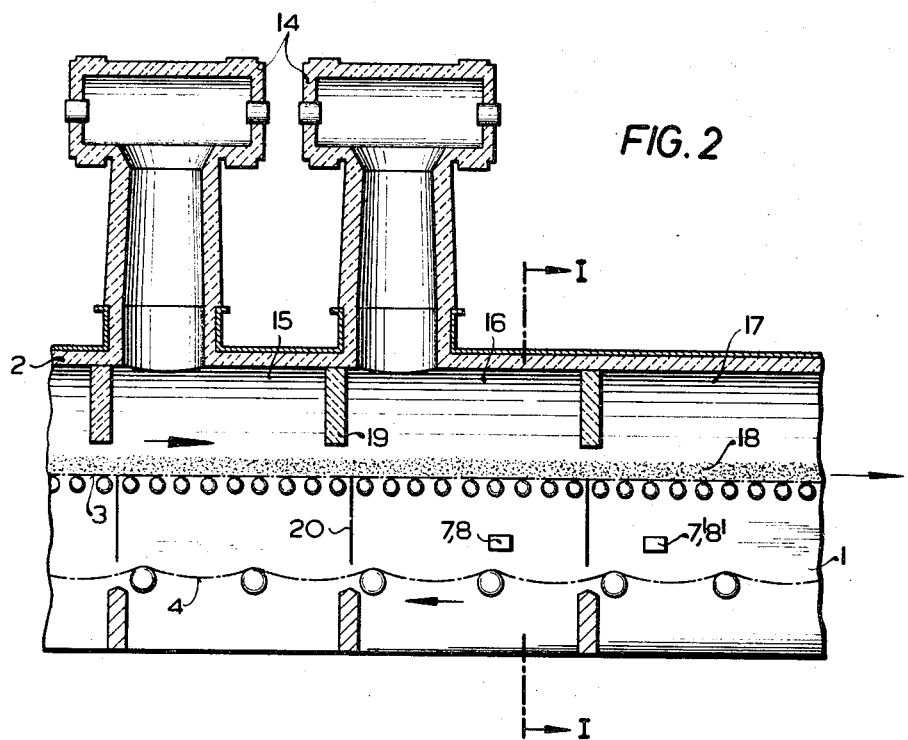
FIGURE 2 represents a longitudinal section through the illustrative phosphate sintering plant and indicates the position of the two correlated test points seen in the direction of motion of the sintering grate, the last calcining chamber, the sojourn/hardening zone series-connected thereto, and the partition walls 19 and 20.

The sintering grate with forward belt 3 and return belt 4 running perpendicularly to the drawing plane in FIGURE 1 is supported on conventional rollers and provided with an overhead arch 2. FIGURE 2 represents the sintering plant section comprising calcining chambers 15 and 16 with burners 14 mounted on arch 2 and the opening portions of the sojourn/hardening chambers 17, i.e., that region in which the maximum sintering grate temperatures are expected to prevail. The layer of sinter material placed on the forward belt or slack strand 3 is indicated by reference numeral 18.

Within that critical regions, the first test point which as indicated above is formed by two infrared radiation-sensitive pick-up means 7, 8 disposed in opposite relationship to one another, is arranged below the slack strand portion 3 of the sinter grate travelling through calcining chamber 16, and adjusted to have a temperature corresponding to the minimum temperature to be maintained. Each of the two infrared radiation-sensitive pick-up means controls through an angle α its own half width of the sintering grate.

The second test point 7', 8' is assembled in a manner analogous to the first test point and disposed near the opening portion of the sojourn/hardening chamber 17, and adjusted to the admissible maximum temperature.

In consideration of the high ambient temperature, each infrared radiation-sensitive pick-up is disposed in a commercially readily available double-walled protecting box 5, 6 or 5', 6' having connections 12, 13 for the supply or discharge of a coolant, e.g. water.

Figure 3:
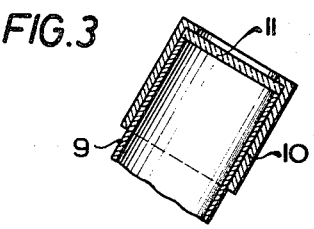
FIGURE 3 represents a longitudinal section through a protecting cap intended to protect the image-forming optical system.

Attached to the lens tube of the image-forming optics there is a sighting tube 9 having mounted thereon a readily exchangeable protecting cap 10 with protecting glass 11 as shown in FIGURE 3 to avoid the access of dust and corrosive gases to the optical system.

The maximum spectral sensitivity of the sensitive element is shifted to the infrared region so as to ensure reliable response on sighting a surface area having a temperature of about 300° C. and emitting rays not visible to the human eye. The temperature causing the sensitive element to respond is adjusted according to operational requirements. Adjusting one test point to an admissible maximum temperature for the sinter grate, say of approximately 600° C., and adjusting the other to the necessary minimum temperature of about 550° C. enables the temperature range suitable for an application such as described to be reliably limited as indicated above. In conventional manner and through a relay, a switching impulse produced when the responding temperature is reached causes a signal means to work which indicates the necessity of any operational change in a given direction.

In an installed phosphate sintering plate, the first test point 7, 8 is disposed e.g. so as to signal by green light and record in a regulating device any temperature drop of the sintering grate below a minimum value to be maintained. In analogous manner, the second test point, 7', 8' signals by red light and records any temperature increase beyond the maximum admissible temperature. This means reliable service instructions for the operator, and proper arrangement and use of switching means and switching operations may ultimately permit completely automatic control of the sintering grate.

What is claimed is:

1. A combination of a traveling sintering grate of the type used for drying and calcining shapes, and a device for measuring and controlling the temperature of the grate consisting of two coplanar infrared radiation-sensitive pick-up means disposed directly below and adjacent to the grate in opposite relationship to one another, one pick-up means being disposed on the left hand side and the other being disposed on the right hand side seen in the direction of motion of the sintering grate, and each pick-up permitting overlapping control of half the width of the sintering grate nearest thereto.

2. A combination as in claim 1 including another pair of infrared radiation-sensitive pick-up means on opposite sides of the sintering grate spaced from the first pair in the direction of grate travel, one of the pairs being responsive to a temperature corresponding to a predetermined maximum temperature of the sintering grate and the other pair being responsive to a temperature corresponding to a pedetermined minimum temperature of the grate.

3. A combination as in claim 1, wherein the infrared radiation-sensitive pick-up including an image-forming optical system with a readily exchangeable slide-on cap having a permeability sufficient for the spectral region concerned so as to avoid the access of dust and corrosive gases and vapours.

4. A process of controlling the temperature of a traveling sintering grate upon which material to be sintered is positioned comprising the steps of providing infrared measuring means directly below and adjacent to the sintering grate, and measuring the infrared radiation emitted by the underside of the grate across the entire width of the grate.

5. A process as in claim 4 wherein the underside of the sintering grate is projected optically onto the infrared measuring means.

6. A process as in claim 4 including the steps of measuring the infrared radiation emitted by the underside of the sintering grate at several points spaced from each other in the direction of grate travel.

7. A process as in claim 4 including the steps of supplying phosphate pellets to the sintering grate, and drying and calcining the phosphate pellets.

8. A process as claimed in claim 4 wherein radiation from visible to long wave infrared is measured by the infrared measuring means to control the temperature of the sintering grate.

References Cited

UNITED STATES PATENTS

| | | | |
|---|---|---|---|
| 2,878,003 | 3/1959 | Dykeman et al. | 263—28 |
| 2,924,695 | 2/1960 | Atkeson | 236—15 |
| 3,100,106 | 8/1963 | Bielenberg et al. | 263—8 |
| 3,155,378 | 11/1964 | Berg et al. | 263—8 |
| 3,257,188 | 6/1966 | Morgan et al. | 236—15 |

FREDERICK L. MATTESON, JR., *Primary Examiner.*

JOHN J. CAMBY, *Examiner.*